United States Patent [19]
Khan et al.

[11] Patent Number: 5,820,844
[45] Date of Patent: Oct. 13, 1998

[54] METHOD FOR THE PRODUCTION OF A PURIFIED MOO₃ COMPOSITION

[75] Inventors: Mohamed H. Khan; James A. Cole, both of Fort Madison, Iowa; Daniel V. Vogel, Hamilton, Ill.; Vijaykumar M. Wagh, Donnellson, Iowa

[73] Assignee: Cyprus Amax Minerals Company, Englewood, Colo.

[21] Appl. No.: 790,702

[22] Filed: Jan. 29, 1997

[51] Int. Cl.⁶ .................................................. C01G 39/00
[52] U.S. Cl. ............................ 423/606; 423/55; 423/53; 423/54; 423/593; 423/58
[58] Field of Search ................................. 423/53, 55, 58, 423/54, 606, 593; 210/761, 912

[56] References Cited

U.S. PATENT DOCUMENTS

| | | |
|---|---|---|
| 3,656,888 | 4/1972 | Barry et al. . |
| 3,714,325 | 1/1973 | Bloom et al. . |
| 3,834,894 | 9/1974 | Spedden et al. . |
| 3,957,946 | 5/1976 | Ronzio et al. ............................ 423/56 |
| 4,046,852 | 9/1977 | Vertes et al. . |
| 4,165,362 | 8/1979 | Reynolds .................................. 423/53 |
| 4,221,588 | 9/1980 | Grimes ......................................... 75/7 |
| 4,379,127 | 4/1983 | Bauer et al. . |
| 4,512,958 | 4/1985 | Bauer et al. . |
| 4,552,749 | 11/1985 | McHugh et al. . |
| 4,724,128 | 2/1988 | Cheresnowsky et al. . |
| 4,762,700 | 8/1988 | Huggins . |

*Primary Examiner*—Gary P. Straub
*Assistant Examiner*—Cam N. Nguyen
*Attorney, Agent, or Firm*—Klaas, Law, O'Meara & Malkin, P.C.; Jay K. Malkin, Esq.

[57] ABSTRACT

A method for producing purified $MoO_3$ from $MoS_2$. $MoS_2$ is initially oxidized to generate an impure $MoO_3$ product containing metallic contaminants and molybdenum sub-oxides. This product is then slurried with a primary water supply to yield a first slurry in which part of the contaminants are dissolved. Preferred slurry temperatures are 25°–97° C. The resulting solid intermediate $MoO_3$ product is removed from the slurry leaving the dissolved contaminants. Next, the intermediate $MoO_3$ product is slurried with a secondary water supply to yield a second slurry in which the remaining contaminants are dissolved. Second slurry temperatures of 150°–250° C. are employed in the presence of an oxygen-containing gas. These conditions oxidize molybdenum sub-oxides to yield $MoO_3$. The resulting purified solid $MoO_3$ product is then removed from the second slurry. This process is highly efficient and avoids using liquid reagents other than water (including acids).

19 Claims, 1 Drawing Sheet

FIG. 1

METHOD FOR THE PRODUCTION OF A PURIFIED MOO₃ COMPOSITION

BACKGROUND OF THE INVENTION

The present invention generally relates to the processing of molybdenum, and more particularly to a high efficiency method designed to produce a purified supply of molybdenum oxide materials (e.g. molybdenum trioxide [$MoO_3$]) from impure starting materials.

In recent years, molybdenum has become increasingly useful for many different purposes. These purposes range from the use of molybdenum as an important strength-imparting component in metal alloys to the incorporation of molybdenum compounds in various chemical catalysts. Likewise, molybdenum compositions are highly suitable for the production of electrical contacts, electrical filaments, colloidal lubricant additives, and other diverse products. Molybdenum (at. no=42; at. wt.=95.94) is primarily found in the form of molybdenite ore which contains molybdenum sulfide ($MOS_2$) and in wulfenite ($PbMoO_3$), although the processing of molybdenite ore is of primary concern as discussed further below. One of the largest sources of $MoS_2$-containing ore (e.g. molybdenite as previously noted) is the Henderson molybdenum mine site operated by the Cyprus Climax Metal Company at Empire, Colo. (U.S.A.) although other mine sites throughout the world are able to produce large amounts of this material. This particular mine site is characterized as a "primary" mine which is capable of producing large amounts of relatively pure product. However, of increasing interest is "by-product" molybdenite which involves a secondary product combined with copper-containing materials obtained from "non-primary" mine sites. This by-product or "secondary" molybdenite is of particular interest in the present case as discussed below. Typically, raw molybdenite ore consists of silicified granite compositions having deposits of soft, black, and hexagonal $MoS_2$ crystalline structures widely dispersed therein (e.g. in an average concentration of only about 0.03–0.6% by weight of the entire raw ore body).

In view of its increasing industrial and scientific importance, substantial research activity has been devoted to the development of improved methods for the purification of $MoS_2$-containing ore products (especially lower-cost "secondary" compositions). Normally, $MoS_2$ derived from molybdenite ore is converted by oxidation to various oxides of molybdenum, followed by further processing in order to obtain a purified molybdenum oxide product consisting primarily of molybdenum trioxide ($MoO_3$). The initial oxidation step in which $MoS_2$ is converted to $MoO_3$ may be accomplished in many ways, including the conventional "roasting" of $MoS_2$ as extensively discussed in U.S. Pat. No. 4,046,852. As indicated in this patent, the raw $MoS_2$-containing molybdenite ore is initially subjected to a physical grinding process in which the ore is reduced in size to a plurality of small particles (e.g. having a typical particle size of about 100 U.S. Tyler mesh or less). The ore particles are then further treated to remove the desired $MoS_2$ therefrom. This step may be accomplished using a variety of techniques, including organic flotation extraction procedures which employ various hydrocarbon compositions and wetting agents that are known in the art for this purpose. As a result (and further discussed in U.S. Pat. No. 4,046,852), the desired $MoS_2$ may be effectively separated from ore-based waste materials (e.g. conventionally known as "gangue") which consist primarily of silica-containing by-products. Specifically, the desired $MoS_2$ compositions will (by virtue of their minimal weight and density levels compared with the gangue), be readily isolated in the flotation froth. Many variations and alternatives exist in connection with the isolation of $MoS_2$ from raw ore, with the selected procedure depending on the type and grade of ore to be processed. In this regard, the present invention shall not be exclusively limited to any particular ore processing methods, with many different conventional procedures being suitable for use in the claimed invention.

The isolated $MoS_2$ is then converted into the desired molybdenum oxide reaction product (primarily $MoO_3$) by a variety of oxidation methods including but not limited to roasting as discussed in U.S. Pat. No. 4,046,852. Basically, roasting may be accomplished by heating the isolated $MoS_2$ in the presence of air (or other oxygen-containing gas) at elevated temperatures typically ranging from about 485°–700° C. over a time period of about 150–700 minutes. Roasting is normally undertaken within one or more conventional hearth furnace systems, with a representative hearth furnace suitable for this purpose being produced by the Nichols Herreshoff Company of Denver, Colo. (U.S.A.) which is a division of the Wheelabrator Company of Sturbridge, Mass. (U.S.A.). However, many different roaster systems may be employed for this purpose, with the present invention not being restricted to any particular apparatus or heating unit. Prior to further processing as discussed below, the roasted impure $MoO_3$ product may be size-reduced in a conventional manner to a more finely-divided product using standard impact milling systems, roll crushers, or other grinding systems known in the art. Further size reduction is typically necessary due to agglomeration of the product which often takes place during the roasting process. In a preferred embodiment, it is desired that the resulting product have an optimum particle size of less than about 200 U.S. Tyler mesh and preferably less than 100 U.S. Tyler mesh. The completed size-reduced product at this stage will consist primarily of $MoO_3$ although many other "contaminants" will typically be present in the product including but not limited to a wide variety of undesired metals and metal compounds in solid (insoluble) form derived from potassium, manganese, sodium, lead, tin, magnesium, calcium, iron, copper, bismuth, aluminum, and others. A certain amount of unreacted $MoS_2$ and other sulfur-containing compounds will also be present as contaminants. Likewise, other non-$MoO_3$ compositions will be combined with the $MoO_3$ product including incomplete molybdenum oxidation products (e.g. collectively defined herein as "sub-oxides"), with such materials comprising $MoO_2$, $Mo_3O_8$, $Mo_3O_{11}$, and other non-$MoO_3$ molybdenum oxides. It is a primary goal of the present invention to accomplish the effective and complete removal of these materials (or conversion into $MoO_3$) in a highly efficient manner as discussed further below. As a result, a highly-purified $MoO_3$ product is obtained which can be used in the manufacture of many desired molybdenum compositions.

Aside from the roasting process described above, other methods exist for the oxidative conversion of $MoS_2$ to molybdenum oxides (primarily $MoO_3$). For example, U.S. Pat. Nos. 4,379,127 and 4,512,958 each involve a procedure in which $MoS_2$ is converted (oxidized) into $MoO_3$ by forming a slurry or suspension of $MoS_2$ in water and thereafter heating the slurry in an autoclave. During the heating process, an oxygen atmosphere is maintained within the autoclave. As a result, $MoO_3$ is generated in accordance with the following exothermic reaction:

$$MoS_2 + 9/2\ O_2 + H_2O \rightarrow MoO_3 + 2H_2SO_4$$

Both of these references also discuss the recycling of various reaction products back to the initial stages of the procedure in order to adjust the density of the slurry so that proper temperature levels are maintained within the system.

U.S. Pat. No. 3,656,888 to Barry et al. discloses a process in which $MoS_2$ starting materials are combined with water in an autoclave to produce a slurry. Pure oxygen, air, or a mixture of both is thereafter added to the autoclave in order to oxidize the $MoS_2$ and produce $MoO_3$ therefrom. The resulting $MoO_3$ product is then washed with ammonium hydroxide which dissolves the $MoO_3$ so that ammonium molybdate is generated. Various "contaminant" materials (e.g. unreacted $MoS_2$) which remain in an undissolved state are subsequently removed from the system using a filter unit. The ammonium molybdate solution is then evaporated or crystallized to generate a solid product which is calcined to yield purified $MoO_3$.

U.S. Pat. No. 3,714,325 to Bloom et al. involves a procedure in which molybdenite ($MoS_2$) which contains Fe and Cu impurities is combined with water to form a slurry. The slurry is then heated to about 100°–150° C. in an oxygen atmosphere at a pressure of about 200–600 psi for 30–60 minutes. After this step, the aqueous slurry is removed from the reaction vessel and filtered to separate the solid residue from the leach liquor. The residue consists primarily of $MoS_2$ (about 80–90% by weight), with the liquor containing the aforementioned metallic impurities (e.g. Cu and Fe).

In U.S. Pat. No. 4,724,128 to Cheresnowsky et al., a method is described wherein $MoO_3$, ammonium dimolybdate, or ammonium paramolybdate is roasted to produce $MoO_2$ (molybdenum dioxide). To remove potassium contaminants from the $MoO_2$, this material is washed with water to generate a slurry. The resulting wash water which contains the potassium contaminants is then removed from the system.

U.S. Pat. No. 4,552,749 to McHugh et al. discloses a procedure in which $MoS_2$ is converted directly to $MoO_2$ by combining the $MoS_2$ with $MoO_3$ vapor. The $MoO_3$ vapor is preferably produced by routing a portion of the previously-generated $MoO_2$ into a flash furnace where it is subjected to "flash sublimation" in order to oxidize the $MoO_2$. As a result, a supply of $MoO_3$ vapor is created which can be used to treat the initial supplies of $MoS_2$ as discussed above.

U.S. Pat. No. 3,834,894 to Spedden et al. involves a detailed process for purifying $MoS_2$ using a diverse sequence of heating and flotation steps to yield a high-grade $MoS_2$ concentrate.

Finally, U.S. Pat. No. 4,046,852 to Vertes et al. (discussed above) discloses a molybdenum processing method in which initial supplies of $MoS_2$ are converted (oxidized) by roasting the $MoS_2$ so that a $MoO_3$ product is generated. Thereafter, the $MoO_3$ is slurried in a highly acidic environment (e.g. using a mineral acid selected from the group consisting of sulfuric acid [$H_2SO_4$], nitric acid [$HNO_3$], and hydrochloric acid [HCl]), along with the addition of heat and oxygen. The solid product from this step is then combined with an ammonia-based composition (e.g. ammonium hydroxide) to generate a supply of soluble ammonium molybdate in a manner similar to that described above in U.S. Pat. No. 3,656,888 to Barry et al. After separating the ammonium molybdate solution from any residual solid (undissolved) waste products, the ammonium molybdate solution is crystallized and subsequently calcined to generate a final molybdenum oxide product.

Notwithstanding the processes described above, a need remains for a highly efficient method in which a purified $MoO_3$ product is produced from $MoS_2$ which focuses on treatment of the initial products obtained following oxidation of the $MoS_2$. In particular, a need remains for a treatment method that uses a minimal number of process steps which simultaneously accomplishes two main goals, namely, (A) the elimination of various metallic contaminants from the impure $MoO_3$ oxidation product; and (B) the conversion of unreacted $MoS_2$ and molybdenum sub-oxides (e.g. $MoO_2$, $Mo_3O_8$, $Mo_3O_{11}$, and other non-$MoO_3$ molybdenum oxides) to $MoO_3$ so that maximum yields of $MoO_3$ are achieved. Likewise, it is desired that these objectives be accomplished without the use of strong acids that are employed in one or more of the above-listed processes (see U.S. Pat. No. 4,046,852 which requires the use of strong mineral acids). The use of such materials (especially strong acids) further increases the costs, safety/environmental concerns, and complexity of the process under consideration. All of these goals are achieved by the unique method of the present invention as discussed below which involves a sequential, dual-stage slurrying process with specific operating parameters. The claimed invention produces highly efficient results (e.g. improved yields of purified $MoO_3$), is entirely different from the other procedures discussed above, and clearly represents a significant advance in the art of molybdenum purification. The benefits and advantages of the claimed invention shall become readily apparent from the specific description of the invention provided below.

SUMMARY OF THE INVENTION

It is an object of the present invention to provide a highly effective method for producing a purified supply of molybdenum trioxide ($MoO_3$) from the oxidation of an initial supply of molybdenum sulfide ($MoS_2$).

It is another object of the invention to provide a method for producing a purified supply of $MoO_3$ from "secondary" or "by-product" $MoS_2$-containing compositions.

It is another object of the invention to provide a method for producing a purified supply of $MoO_3$ from the oxidation of $MoS_2$ that is characterized by a minimal number of process steps which enable the removal of undesired contaminants from the initial $MoO_3$ oxidation product.

It is another object of the invention to provide a method for producing a purified supply of $MoO_3$ from the oxidation of $MoS_2$ which specifically enables the removal of metallic impurities (e.g. elemental potassium, manganese, sodium, lead, tin, magnesium, calcium, iron, copper, bismuth, aluminum, and others [as well as compounds thereof]) in a highly effective and complete manner.

It is another object of the invention to provide a method for producing a purified supply of $MoO_3$ from the oxidation of $MoS_2$ which likewise enables the conversion of various sub-oxides of molybdenum (e.g. $MoO_2$, $Mo_3O_8$, $Mo_3O_{11}$, and other non-$MoO_3$ molybdenum oxides) into $MoO_3$ so that maximum yields of purified $MoO_3$ can be obtained.

It is another object of the invention to provide a method for producing a purified supply of $MoO_3$ from the oxidation of $MoS_2$ which also facilitates the conversion of residual (e.g. unreacted) $MoS_2$ into $MoO_3$ so that maximum yields of purified $MoO_3$ can again be obtained.

It is a further object of the invention to provide a method for producing a purified supply of $MoO_3$ from the oxidation of $MoS_2$ which avoids the use and introduction of externally-derived acid materials (e.g. mineral acids such as sulfuric acid [$H_2SO_4$]) in the purification process.

It is a further object of the invention to provide a method for producing a purified supply of $MoO_3$ from the oxidation of $MoS_2$ which is highly cost-effective and involves a minimal amount of chemical reagents and materials.

It is an even further object of the invention to provide a method for producing a purified supply of $MoO_3$ in which the above-described goals are accomplished through the use of a unique, dual-stage slurrying procedure which is undertaken in a sequential manner and employs a series of specific operating parameters which cooperate to achieve highly effective results.

In accordance with the foregoing objects, the present invention involves a unique and highly efficient method for obtaining a supply of purified molybdenum trioxide ($MoO_3$) from an initial impure $MoO_3$ product obtained from the oxidation of $MoS_2$. The purified $MoO_3$ product which is generated in accordance with the claimed process may thereafter be used as a precursor compound in the production of a wide variety of molybdenum compositions ranging from molybdenum-containing catalysts to elemental molybdenum. The claimed invention provides a variety of benefits and is characterized by a unique sequence of process steps which clearly differentiates it from prior purification methods. These benefits will become readily apparent from the following brief Summary of the Invention. More detailed information concerning the claimed process will be presented below in the Detailed Description of Preferred Embodiments section.

In the initial stages of the reaction process, a supply of molybdenum sulfide ($MoS_2$) is first provided. $MoS_2$ is typically derived from molybdenite ore which is available from numerous mine sites throughout the world in various grades including impure "secondary" ore products which are of particular interest in this case. After processing the ore in a conventional manner (discussed further below) to separate the $MoS_2$ from the surrounding gangue (e.g. which normally comprises a variety of silica-containing granite materials), the resulting initial supply of $MoS_2$ is thereafter oxidized. This step results in the production of an impure molybdenum trioxide ($MoO_3$) reaction product which is combined with a substantial amount of solid (insoluble) contaminants. The term "contaminants" as used herein shall encompass all residual non-$MoO_3$ materials combined with the $MoO_3$ regardless of form including but not limited to undesired metals and compounds therefrom derived from potassium, manganese, sodium, lead, tin, magnesium, calcium, iron, copper, bismuth, aluminum, and others. Also included as a contaminant are residual (e.g. unreacted) amounts of $MoS_2$ and other sulfur-containing compounds. Finally, the impure $MoO_3$ reaction product will likewise contain non-$MoO_3$ molybdenum oxide products (designated herein as molybdenum "sub-oxides"), with such materials comprising $MoO_2$, $Mo_3O_8$, $Mo_3O_{11}$, and other non-$MoO_3$ molybdenum oxides. Substantially all of these non-$MoO_3$ materials are removed and/or converted to $MoO_3$ using the process of the present invention in order to generate a final purified molybdenum trioxide ($MoO_3$) product. The method described herein again involves a minimal number of process steps and avoids the use of highly acidic reagents (e.g. mineral acids).

Many different methods may be employed to oxidize the initial supply of $MoS_2$ to produce the impure $MoO_3$ reaction product including the use of a conventional roasting apparatus (e.g. a multiple hearth furnace). Roasting typically involves the thermal conversion of $MoS_2$ in an atmosphere comprising at least one oxygen-containing gas (e.g. air) within the selected furnace at temperatures ranging from about 485°–700° C. as discussed in U.S. Pat. No. 4,046,852 to Vertes et al. Other methods for accomplishing the conversion of $MoS_2$ to the impure $MoO_3$ reaction product include but are not limited to the combination of $MoS_2$ with water and an oxygen-containing gas (e.g. air, pure $O_2$, or mixtures thereof) in a heated slurry followed by filtration and removal of the solid product. This oxidation method is disclosed in a variety of patents including U.S. Pat. No. 3,656,888 to Barry et al.; U.S. Pat. No. 4,379,127 to Bauer et al.; and U.S. Pat. No. 4,512,958 to Bauer et al. In this regard, the present invention shall not be restricted to any particular oxidation method for generating the impure $MoO_3$ reaction product, with many conventional methods being suitable for this purpose.

Next, in accordance with the unique dual-stage slurrying process of the claimed invention, the impure $MoO_3$ reaction product is combined with a primary supply of water to generate a first slurry. In a preferred and optimum embodiment, the primary supply of water will consist of deionized water which lacks any acidic materials therein (e.g. externally-added mineral acids such as nitric acid [$HNO_3$], sulfuric acid [$H_2SO_4$], and/or hydrochloric acid [$HCl$]). The absence of acid materials in the first slurry provides many benefits ranging from reduced material costs and environmental impact to improved system safety and performance. To achieve maximum results, the water is added in an amount sufficient to enable the first slurry to have a slurry density of about 10–55% by weight solids. The term "slurry density" as used herein involves the total percentage by weight of combined (total) solid materials in the slurry under consideration.

After or during formation of the first slurry, the slurry is preferably maintained (e.g. heated) to a temperature of about 25°–97° C. over an optimum time period of approximately 45–90 minutes. As a result of the first slurrying step (and the heating associated therewith), at least a portion of the undesired solid (insoluble) contaminants associated with the impure $MoO_3$ reaction product dissolves within the primary supply of water used to produce the first slurry. The removed contaminants in this step typically involve one or more of the metals and/or metal compounds listed above which are converted to soluble (ionic) forms in accordance with the foregoing process. Further information regarding this stage of the claimed method and the technical aspects of metallic contaminant removal will be discussed below in the Detailed Description of Preferred Embodiments section.

Thereafter, the primary supply of water (which contains the dissolved portion of contaminants therein as discussed above) is removed from the first slurry by filtration or other conventional separatory process to yield a solid intermediate $MoO_3$ product. The contaminants previously solubilized in accordance with the prior slurrying step which were dissolved within the primary supply of water are effectively separated from the solid intermediate $MoO_3$ product during removal of the primary supply of water from the first slurry. While further details involving the nature of the solid intermediate $MoO_3$ product shall be provided below, this composition will primarily contain molybdenum trioxide (e.g. $MoO_3$) in combination with small amounts of remaining (e.g. residual) metallic contaminants of the types discussed above, unreacted $MoS_2$, and molybdenum "sub-oxides" as previously defined which include but are not limited to $MoO_2$, $Mo_3O_8$, $Mo_3O_{11}$, and other non-$MoO_3$ molybdenum oxides. Again it is necessary to remove these compositions or convert them to $MoO_3$ where appropriate in order to produce a final $MoO_3$ product of maximum purity.

To accomplish this goal in a unique and effective manner, the second stage of the claimed dual-stage slurrying process is implemented. Specifically, the solid intermediate $MoO_3$ product (after being washed one or more times with water if needed) is combined with a secondary supply of water and retained therein to generate a second slurry. In a preferred and optimum embodiment, the secondary supply of water will consist of deionized water which again lacks any acidic materials therein (e.g. externally-added mineral acids such as nitric acid [$HNO_3$], sulfuric acid [$H_2SO_4$], and/or hydrochloric acid [$HCl$]). The absence of acidic materials in the second slurry further reduces the material costs and environmental impact associated with the claimed process, and likewise provides improved system safety and performance. To achieve optimum results, the secondary supply of water is added in an amount sufficient to enable the second slurry to have a slurry density of about 10–55% by weight solids, with the term "slurry density" being defined above.

After or during formation of the second slurry, it is heated (e.g. in an autoclave or comparable reaction vessel) to a preferred temperature of about 150°–250° C. for a time period of about 30–90 minutes in an atmosphere comprising at least one oxygen-containing oxidizing gas. Representative oxidizing gases are selected from the group consisting of $O_{2(g)}$, air, and mixtures thereof (e.g. $O_{2(g)}$-enriched air) as discussed further below. In a preferred embodiment which is designed to achieve optimum results, the gas is maintained at a gas pressure within the selected autoclave or other reaction vessel of about 150–250 psi. As a result of this second slurrying step, three main goals are achieved in accordance with the claimed purification process, namely, (1) the dissolution/ionization of any remaining (residual) amounts of metallic contaminants within the secondary supply of water which were not previously dissolved within the primary supply of water; (2) the oxidation of residual (unreacted) amounts of $MoS_2$ to form $MoO_3$; and (3) the further oxidation of any incompletely-reacted molybdenum "sub-oxides" in order to convert these compounds into $MoO_3$. In this manner, maximum yields of purified $MoO_3$ can be obtained compared with prior processing methods.

Finally, the secondary supply of water (which contains the previously-remaining amount of contaminants dissolved therein as discussed above) is removed from the second slurry by filtration or other conventional separatory process to yield a final purified solid $MoO_3$ product. The final purified solid $MoO_3$ is then washed one or more times as needed and desired with water. The contaminants dissolved within the secondary supply of water discussed above are effectively separated from the purified solid $MoO_3$ product during removal of the secondary supply of water from the second slurry. Likewise, previously-unreacted amounts of $MoS_2$ and molybdenum "sub-oxides" are converted into $MoO_3$ in order to further improve the purity and yield of the final product.

As discussed in substantial detail below, the present invention and the unique dual-stage slurrying process associated therewith enables the production of a highly-purified $MoO_3$ solid product. The purified $MoO_3$ product can then be used directly in generating a number of important molybdenum products which again range from elemental molybdenum to complex molybdenum-containing catalysts. Contaminant removal (as well as the conversion of residual $MoS_2$ and molybdenum "sub-oxides" to $MoO_3$) in accordance with the invention significantly improves the overall operating efficiency of the entire production system and likewise provides the following specific benefits: (1) the ability to achieve $MoO_3$ purification in a highly simplified manner compared with prior processes; (2) elimination of the need to use acidic materials (e.g. mineral acids) and other harsh chemical reagents in the purification process; (3) a reduction in the number of process steps needed to achieve high yields of the desired final product; (4) the ability to rapidly remove metallic contaminants from the $MoO_3$ and likewise convert molybdenum sub-oxides and residual $MoS_2$ to $MoO_3$ in a process which involves water as the single active primary liquid reagent; and (5) a high level of operational efficiency which enables large amounts of purified $MoO_3$ to be generated in a minimal amount of time using reduced levels of labor and materials. Accordingly, the present invention substantially departs from prior purification methods and represents a significant advance in the field of molybdenum refining.

These and other objects, features, and advantages of the claimed invention shall be further discussed in the Brief Description of the Drawings and Detailed Description of Preferred Embodiments sections provided below.

DETAILED DESCRIPTION OF PREFERRED EMBODIMENTS

As noted above, the present invention involves a unique series of sequential steps which are used to treat supplies of impure molybdenum trioxide ($MoO_3$) obtained from the oxidation of $MoS_2$ in order to remove various contaminants and incomplete reaction products from the $MoO_3$. In particular, the claimed process uses a sequential dual-stage slurrying procedure and specific operating parameters to effectively produce a purified final $MoO_3$ product. In order to provide a complete understanding of the present invention, a preferred embodiment and best mode of the claimed process will now be presented in detail.

Figure 1:
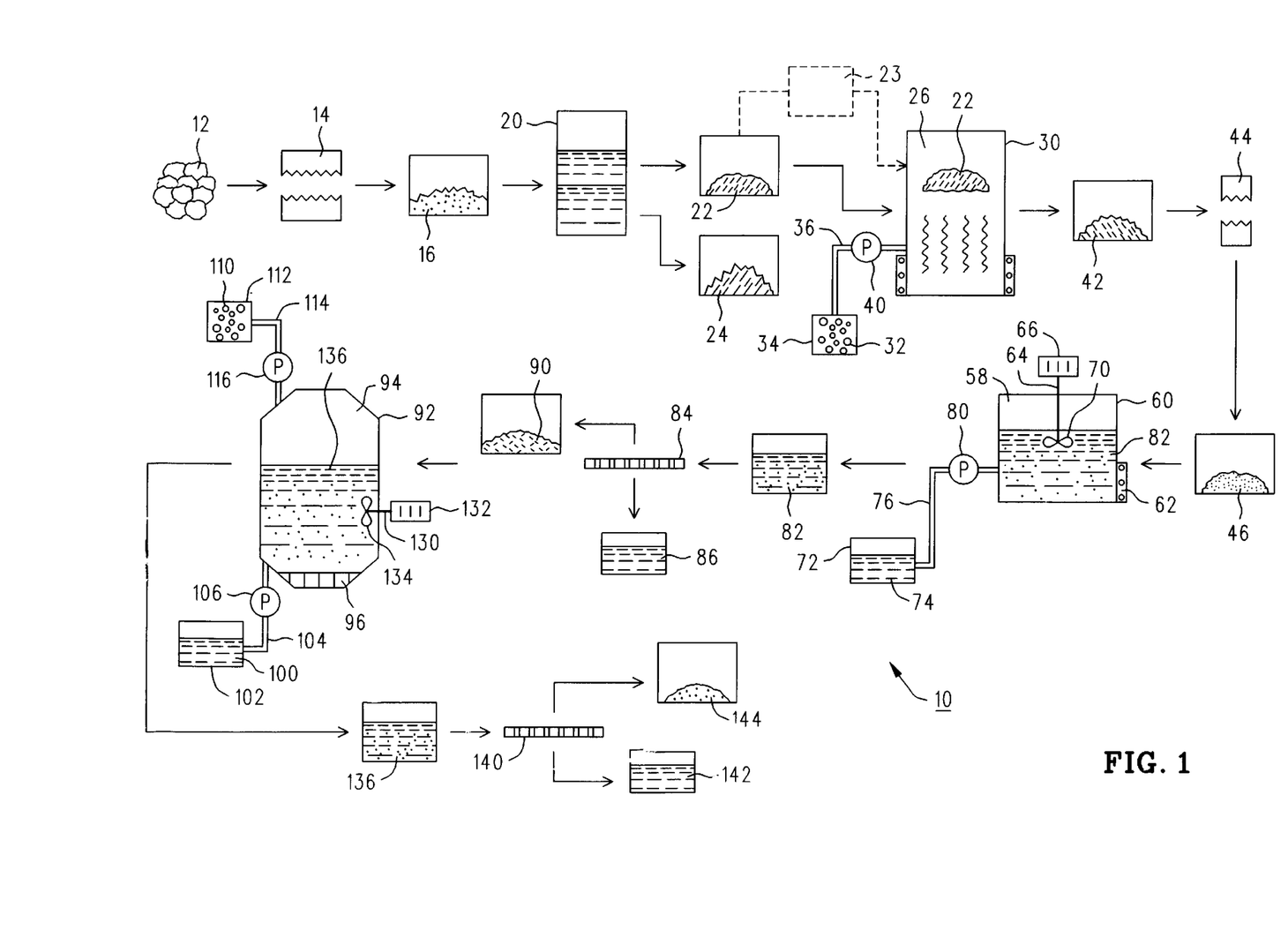
FIG. 1 is a schematic representation of the process steps used in a preferred embodiment of the present invention to generate a highly purified supply of molybdenum trioxide ($MoO_3$) from impure starting materials.

With reference to FIG. 1, a schematic illustration of the process steps and procedures used to generate a purified $MoO_3$ product from impure $MoO_3$ starting materials is provided. At the outset, it is important to emphasize that the present invention shall not be limited to any specific hardware and processing equipment, with many different types of operating components being suitable for use in the claimed process. As illustrated in FIG. 1, the basic method (which is generally designated at reference number 10) initially involves the step of providing a supply of molybdenum sulfide ($MoS_2$) which is subsequently oxidized to yield an impure $MoO_3$ reaction product as discussed below. To obtain the initial $MoS_2$ starting material in a preferred embodiment of the invention, this material is derived from a supply of raw molybdenite ($MoS_2$-containing) ore 12 (FIG. 1) which is available from numerous mine sites throughout the world. For example, a representative mine site from which large supplies of molybdenite ore 12 may be obtained is the Henderson mine operated by the Cyprus Climax Metal Company at Empire, Colo. (U.S.A.). This mine site is generally characterized as a "primary" mine which is capable of producing large amounts of relatively pure product. However, of increasing interest is "by-product" molybdenite which involves a secondary product combined with copper-containing materials obtained from "non-primary" mine sites (e.g. the Cyprus Sierrita Mine at Tucson, Ariz. (U.S.A.) and others). While the present invention is capable of effectively processing both "primary" and "secondary" ore materials, by-product/secondary molybdenite is of primary interest in this case.

The raw molybdenite ore 12 is thereafter processed in a conventional manner to separate the desired $MoS_2$ from the surrounding waste material which is normally comprised of silicified granite and is conventionally known as "gangue". With continued reference to FIG. 1, a basic procedure for isolating the $MoS_2$ from other components of the molybdenite ore 12 is schematically illustrated. This process is further discussed in U.S. Pat. No. 4,046,852 to Vertes et al. Specifically, the ore 12 (which typically contains about 0.03"0.6% by weight $MoS_2$ in the form of black, hexagonal crystals) is first subjected to a size reduction stage using a conventional size reduction (e.g. grinding and crushing) apparatus 14 known in the mining industry for this purpose. A representative size reduction apparatus 14 suitable for use in the claimed process will consist of a standard impact milling system or roll crusher unit. However, other grinding and crushing systems may likewise be employed, with the present invention not being exclusively restricted to any particular type of size reduction apparatus 14.

As a result of the grinding and crushing step described above, the ore 12 is converted into a ground ore product 16 which is typically in particulate form having an average particle size of about 100 U.S. Tyler mesh or less. Thereafter, the ground ore product 16 may be treated in many different ways to remove the desired $MoS_2$ therefrom. In the embodiment of FIG. 1 (as specifically discussed in U.S. Pat. No. 4,046,852 to Vertes et al.), the ground ore product 16 is introduced into a conventional flotation extraction system 20 which employs numerous reagents including various hydrocarbon compositions, as well as selected wetting agents. Flotation extraction systems are known in the mining industry, with specific information involving a representative flotation-based extraction system for processing molybdenite ore being described in U.S. Pat. Nos. 4,046,852 to Vertes et al. and 3,834,894 to Spedden et al. A wide variety of different flotation chemicals may be used in connection with conventional flotation systems of the type described above including but not limited to butyl carbitol, allyl esters, and potassium xanthates. Typically, the "float" product associated with a representative flotation extraction system 20 as shown in FIG. 1 will contain the desired isolated initial supply of molybdenum sulfide 22 ($MoS_2$). The "sink" product will consist primarily of the waste gangue 24 which may be discarded or further processed if desired. It is important to emphasize that the process steps illustrated in FIG. 1 in connection with the flotation extraction of the ground ore product 16 involve a schematic representation, with the actual flotation procedure often using multiple, sequential flotation stages and intervening grinding steps (e.g. as many as are needed in view of the particular type of ore being processed and other extrinsic considerations). Accordingly, the present invention shall not be limited to any particular flotation procedures (or other processes for obtaining the initial supply of molybdenum sulfide 22), with many other conventional techniques being applicable as discussed above.

At this stage, the initial supply of molybdenum sulfide 22 is ready for further processing, and will typically have a particle size of about 200–400 U.S. Tyler mesh. The initial supply of molybdenum sulfide 22 will likewise have a number of residual compositions associated therewith which originated within the raw ore 12. Specifically, these materials are carried over into the initial supply of molybdenum sulfide 22 from the ground ore product 16, with the initial supply of molybdenum sulfide 22 normally containing about 0.2–22% by weight non-$MoS_2$ compositions. These non-$MoS_2$ materials will typically consist of small amounts of residual gangue as well as various gangue-derived metals and metal compounds (e.g. metal oxides, chlorides, sulfides, and the like) which include but are not limited to the following metals: potassium, manganese, sodium, lead, tin, magnesium, calcium, iron, copper, bismuth, and aluminum. The exact amount and concentration of these materials within the initial supply of molybdenum sulfide 22 (with such materials collectively being designated herein as "contaminants") will vary depending on the particular ore body from which the initial ore 12 was obtained, as well as the level of preliminary treatment used to produce the initial supply of molybdenum sulfide 22. As discussed further below, these naturally-derived contaminants must be removed at some point during the molybdenum purification process in order to prevent undesired contamination of the final molybdenum products generated from the purified molybdenum oxide ($MoO_3$) to be produced in accordance with this invention.

With continued reference to FIG. 1, the initial supply of molybdenum sulfide 22 is then oxidized in a conventional manner to generate an impure supply of molybdenum oxide ($MoO_3$) which will be discussed in substantial detail below. However, prior to oxidation, it is important to note that the initial supply of molybdenum sulfide 22 may be subjected to an optional hydrometallurigical upgrade step (designed schematically at reference number 23 in dashed lines in FIG. 1). This optional step involves leaching of the initial supply of molybdenum sulfide 22 with a selected reagent (e.g. $FeCl_3$/CN) to "upgrade" and preliminarily remove various materials from the initial supply of molybdenum sulfide 22 such as extraneous copper and lead if the initial supply of molybdenum sulfide 22 is heavily contaminated. Again, it should be emphasized that this step is optional and a decision to use it will be undertaken in accordance with preliminary pilot tests on the materials being processed.

While a preferred oxidation process is illustrated in FIG. 1, the claimed invention shall not be restricted to any particular method for oxidizing the initial supply of molybdenum sulfide 22, with a variety of different methods being suitable for use in the claimed procedure. In a preferred embodiment, the initial supply of molybdenum sulfide 22 with be oxidized using a standard process known as "roasting" which involves the application of heat in the presence of an oxygen-containing gas (discussed below). This process is again disclosed in detail in U.S. Pat. No. 4,046,852 to Vertes et al. As schematically illustrated in FIG. 1, the initial supply of molybdenum sulfide 22 is transferred into the interior region 26 of a conventional furnace apparatus 30 (e.g. a commercially-available multiple hearth furnace which may be obtained from many sources including the Nichols Herreshoff Company of Denver, Colo. (U.S.A.) which is a division of the Wheelabrator Company of Sturbridge, Mass. (U.S.A.). Within the furnace apparatus 30, the initial supply of molybdenum sulfide 22 is then heated to a temperature of about 485°–700° C. for a time period of about 150–700 minutes. In addition, heating is necessarily undertaken in the presence of an oxygen-containing atmosphere (e.g. air, pure $O_{2(g)}$, or a mixture of both to produce a supply of air augmented with $O_{2(g)}$). In an exemplary embodiment, a supply of compressed oxygen-containing gas 32 (either plain air, $O_{2(g)}$ or air augmented with purified $O_{2(g)}$) is provided for this purpose which is retained within a gas storage vessel 34 at ambient temperature levels (e.g. 20°–25° C.). The gas 32 is then delivered into the interior region 26 of the furnace apparatus 30 from the vessel 34 via conduit 36. An optional in-line gas pump 40 (e.g. of a conventional gas-displacement variety) can be used within the conduit 36 at this stage if needed for proper gas delivery as determined by preliminary pilot testing. Likewise, it should be noted that if air is used as the oxygen-containing gas 32, it can be drawn directly from the outside atmosphere without initial storage in the gas storage vessel 34.

As a result of this oxidizing step, an impure $MoO_3$ reaction product 42 is generated from the initial supply of molybdenum sulfide 22 which is illustrated in FIG. 1. However, regarding the oxidizing process described above, the present invention shall not be entirely limited to production of the impure $MoO_3$ reaction product 42 using any given procedure (e.g. roasting). It is contemplated that different oxidizing methods known in the art may also be employed for this purpose as noted above. Other procedures suitable for accomplishing oxidation of the initial supply of molybdenum sulfide 22 include but are not limited to the combination of this material with water and an oxygen-containing gas (e.g. air, pure $O_{2(g)}$, or mixtures thereof) to form a slurry, followed by filtration and removal of the solid oxidized $MoO_3$ product. This oxidation method is disclosed in a variety of patents including U.S. Pat. No. 3,656,888 to Barry et al.; U.S. Pat. No. 4,379,127 to Bauer et al.; and U.S. Pat. No. 4,512,958.

The impure $MoO_3$ reaction product 42 is now ready for further treatment in accordance with the process of the claimed invention. Specifically, the reaction product 42 will contain the contaminants listed above which specifically involve various gangue-derived metals and metal compounds (e.g. metal oxides, chlorides, sulfides, and the like) which include but are not limited to the following metals: potassium, manganese, sodium, lead, tin, magnesium, calcium, iron, copper, bismuth, and aluminum). In addition, the impure $MoO_3$ reaction product 42 will likewise contain a residual amount of unreacted $MoS_2$ which will need to be further converted into $MoO_3$ in order to ensure that maximum yields of purified $MoO_3$ are ultimately produced. Furthermore, the impure $MoO_3$ reaction product 42 will contain varying amounts of non-$MoO_3$ molybdenum oxide products (designated herein as molybdenum "sub-oxides" as previously noted), with such materials comprising $MoO_2$, $Mo_3O_8$, $Mo_3O_{11}$, and other non-$MoO_3$ molybdenum oxides. These "sub-oxides" are typically formed during the oxidation process discussed above because of insufficient oxidation time, mineral surface exposure limitations, and/or the "blinding" (e.g. covering) of various portions of the initial supply of molybdenum sulfide 22 with various contaminants which "block" the oxidation process. Conversion of these materials into $MoO_3$ in accordance with the present invention is desired in order to achieve maximum yields of purified $MoO_3$. In a typical processing situation, the impure $MoO_3$ reaction product 42 will primarily contain molybdenum trioxide ($MoO_3$) which is the desired composition in this case, along with about 0–0.5% by weight residual (unreacted) $MoS_2$ and other sulfides including FeS, about 1–5% by weight molybdenum "sub-oxides", and about 1–15% by weight other metallic contaminants as listed above. However, the exact amount of non-$MoO_3$ impurities in the impure $MoO_3$ reaction product 42 will vary depending on the starting materials being used (e.g. the chemical and physical nature of the initial ore 12), the oxidation conditions encountered within the furnace apparatus 30, and other factors as determined by preliminary testing.

The presence of non-$MoO_3$ compositions as outlined above in the impure $MoO_3$ reaction product 42 must be removed since they can adversely affect the purity of the desired compounds which are ultimately produced from the impure $MoO_3$ reaction product 42 including elemental molybdenum and complex molybdenum catalysts as discussed above. Likewise, the overall yields of purified $MoO_3$ will be reduced unless unreacted $MoS_2$ and molybdenum "sub-oxides" are effectively converted to $MoO_3$ in a rapid and complete manner. The claimed process involves a unique dual-stage slurrying procedure which efficiently accomplishes these goals, namely, (1) the elimination of extraneous metallic contaminants; (2) further oxidation of remaining (unreacted) $MoS_2$ into $MoO_3$; (3) conversion of molybdenum "sub-oxides" into $MoO_3$; and (4) conversion of other extraneous sulfides into their oxides. In this regard, the unique multiple capabilities of the claimed process clearly distinguish it from prior processing methods.

With continued reference to FIG. 1, the impure $MoO_3$ reaction product 42 is now treated in accordance with the present invention so that intensive purification of this composition can take place. Prior to subsequent treatment, the reaction product 42 can be further size-reduced if excessive agglomeration of the product 42 occurred within the furnace apparatus 30 during the oxidation process. If additional size reduction is needed as determined by routine observation and testing (e.g. to an average and preferred particle size of about 10–200 U.S. Tyler mesh), the impure $MoO_3$ reaction product 42 can be transferred into an auxiliary size reduction apparatus 44 (FIG. 1). The size reduction apparatus 44 which will typically consist of a conventional system designed for this purpose (e.g. a standard impact milling unit or roll crusher known in the art). As a result of this step (which is optional and used on an "as-needed" basis), a size-reduced impure $MoO_3$ reaction product 46 is generated which is ready for further processing.

As shown in FIG. 1, the reaction product 46 is thereafter routed into the interior region 58 of a containment tank 60 which is preferably manufactured from a relatively inert and durable material including but not limited to stainless steel and the like. Operatively connected to the containment tank 60 is a heater unit 62 of conventional design and an agitator system 64. The agitator system 64 consists of an electric motor unit 66 and a mixing blade 70 connected to and driven by the motor unit 66. Representative heating systems suitable for use as the heater unit 62 will consist of a conventional steam-type heating system or immersion-type heating coil apparatus known in the art, although the present invention shall not be exclusively limited to any particular heating system for this purpose. In fluid communication with the first containment tank 60 is a vessel 72 containing a primary supply of water 74 (preferably deionized and maintained at an ambient temperature of about 20°–25° C.). The vessel 72 is connected to the containment tank 60 using tubular conduit 76 having an in-line pump 80 therein (e.g. of a conventional type suitable for fluid transfer including but not limited to commercially-available centrifugal pump systems).

Using the equipment and components discussed above, the size-reduced impure $MoO_3$ reaction product 46 is delivered into the interior region 58 of the containment tank 60 followed by the addition of water thereto from the primary supply of water 74 using the conduit 76 and in-line pump 80. Combination of the reaction product 46 with the primary supply of water 74 in the containment tank 60 produces a first slurry 82 within the tank 60, with the term "slurry" being defined to involve a liquid having one or more undissolved solids suspended therein. In a preferred embodiment designed to produce high-efficiency purification, the first slurry 82 will have a slurry density which is preferably about 10–55% by weight solids (optimally about 30–35% by weight solids). The term "slurry density" as used herein shall involve the total amount (in % by weight) of solid materials within the slurry under consideration. The slurry density values listed above are preferred because they facilitate optimum handling and leaching of the product.

To accomplish the production of a first slurry 82 having the above-described characteristics, approximately 0.65–0.75 liters of the primary supply of water 74 will preferably be added per kg of the size-reduced impure $MoO_3$ reaction product 46, although this amount may vary depending on the chemical and physical character of the reaction product 46. The precise amount of water 74 to be added in a given situation will be determined in accordance with preliminary pilot studies on the specific compositions being processed.

After or during formation of the first slurry 82 as discussed above, it is heated using the heater unit 62 to a temperature of about 25°–97° C. (with optimum results being obtained within a temperature range of about 70°–85° C.). During heating of the first slurry 82 as discussed above, it is agitated (e.g. mixed) using the agitator system 64 in which the mixing blade 70 is rotated by the motor unit 66. Heating and mixing of the first slurry 82 within the containment tank 60 preferably takes place over a time period of about 45–90 minutes (optimally about 60 minutes). During this first slurrying stage, an important part of the desired purification process takes place. Specifically, a significant portion of the metallic contaminants listed above (e.g. metals and metallic compounds which, prior to this step, were substantially insoluble) become soluble during the foregoing procedure. As a result, these materials dissolve within the primary supply of water 74 which is used to form the first slurry 82. Dissolution of these contaminants takes place at this stage of the claimed process because of their reduced solubility levels. As noted above, this step enables the dissolution and removal of a substantial amount of the total metallic contaminants within the $MoO_3$ reaction product 46. The non-$MoO_3$ materials that remain undissolved within the first slurry 82 typically comprise unreacted or unoxidized materials and a large portion of the initially-present alkali metal compositions. Such compositions will be removed in the next slurrying step which is part of the unique dual-stage slurry process claimed herein.

Next, the liquid portion of the first slurry 82 which involves the primary supply of water 74 with dissolved contaminants therein is separated (e.g. removed) from the solid portion of the slurry 82. With reference to FIG. 1, this process is accomplishing by passage of the first slurry 82 through a primary filtration system 84 which is schematically illustrated in FIG. 1. If needed and desired in accordance with preliminary pilot studies, the first slurry 82 may first be allowed to settle for a time period of about 10–30 minutes (optimally about 15 minutes) prior to filtration. Many different conventional separatory units may be used in connection with the primary filtration system 84, with the present invention not being limited to any particular apparatus for this purpose. For example, the primary filtration system 84 may consist of a standard pressure leaf-type filter system or a conventional drum filter, horizontal belt filter, and the like. As a result of this step, the filtrate 86 (which contains the dissolved contaminants and other dissolved non-$MoO_3$ compositions) is effectively separated from the remaining solid material which shall be designated as a solid intermediate $MoO_3$ product 90. At this stage, the filtrate 86 may be discarded, stored for further processing, or treated in a conventional manner (not shown) to recover the metals and metal compounds therein. The solid intermediate $MoO_3$ product 90 primarily contains $MoO_3$ and about 1–15% by weight total non-$MoO_3$ materials (listed above) which were not removed during the first slurrying stage. However, the exact composition of the solid intermediate $MoO_3$ product 90 will vary in view of many factors including the nature of the compositions being processed. In accordance with the unique method of the claimed invention and in recognition of the need to further purify the solid intermediate $MoO_3$ product 90, the second half of the unique dual-stage slurrying procedure is now undertaken. However, as a final point of information regarding the first slurrying or "preliminary treatment" stage of the invention, it is noted that this step can actually be repeated multiple times depending on the level of contamination associated with the $MoO_3$ materials being processed as determined by preliminary studies. While the present invention preferably involves a single first slurrying step, it shall be deemed equivalent to employ multiple preliminary treatment stages of the type described above prior to the secondary slurrying stage. Regardless of the number of times a given slurrying stage is repeated, the present invention is appropriately characterized as a "dual-stage slurry process" since it essentially involves (1) one or more first slurrying steps undertaken at low temperature and pressure conditions followed by (2) one or more second slurrying steps involving high temperature and pressure conditions, with each slurrying stage accomplishing a specific goal. The first slurrying stage is designed to act as a preliminary processing step which removes a substantial portion of the undesired metallic contaminants so that the overall "contaminant load" in the system is reduced. The second slurrying stage (discussed further below) removes residual/remaining metallic contaminants not eliminated in the first slurrying stage and also oxidizes unreacted $MoS_2$ and molybdenum "sub-oxides" to improve yields of purified $MoO_3$. For these reasons, the claimed dual-stage process is unique and highly effective.

The solid intermediate $MoO_3$ product 90 obtained from the primary filtration system 84 is then ready for further processing. However, if desired, the product 90 can be washed one or more times with selected volumes of deionized water on an "as-needed" basis as determined by routine preliminary testing. To process the solid intermediate $MoO_3$ product 90 in the second slurrying stage of the claimed dual-step procedure, the product 90 is routed into an autoclave 92 of standard and conventional design which includes an interior region 94 and a built-in heating system 96. In a preferred embodiment, the autoclave 92 will have a capacity of at least about 2 times (2×) the slurry volume that is to be processed therein, and will likewise be capable of operating at very high temperature and pressure levels (e.g. about 200–650 psi and about 200°–400° C.). A representative commercially-available titanium-lined autoclave suitable for this purpose includes a system manufactured by Nooter, Inc. of St. Louis, Mo. (U.S.A.). However, the present invention shall not be exclusively limited to any particular apparatus in connection with the autoclave 92, with many different commercially-available systems being suitable for use in the claimed process.

Operatively connected to the autoclave 92 and in fluid communication with the interior region 94 inside the autoclave 92 is a secondary supply of water 100 (preferably deionized) which is stored within a tank 102. The tank 102 is connected to the autoclave 92 via tubular conduit 104 which includes in-line pump 106 therein. The pump 106 is preferably of the same type as pump 80 described above in connection with the containment tank 60. Also connected to the autoclave 92 and in fluid communication with the interior region 94 of the autoclave 92 is a supply of at least one compressed oxygen-containing oxidizing gas 110 which is retained within a gas storage chamber 112 schematically shown in FIG. 1. The gas storage chamber 112 is connected to the autoclave 92 via tubular conduit 114. An optional in-line gas pump 116 (e.g. of a conventional gas-displacement variety) can be used within the conduit 114 at this stage if needed for proper gas delivery as determined by preliminary pilot testing. Likewise, if air is used as the oxidizing gas 110, it can be drawn directly from the outside atmosphere without storage in the gas storage chamber 112.

Many different types of oxygen-containing gases may be employed in connection with the oxidizing gas 110, with the claimed invention not being limited to any particular composition for this purpose. As further discussed below, the oxidizing gas 110 is designed to convert any residual molybdenum "sub-oxides" into $MoO_3$ and will likewise convert any remaining (unreacted) amounts of $MoS_2$ into $MoO_3$ so that yields of the final purified $MoO_3$ product can be improved. Representative oxygen-containing gaseous materials suitable for use as the oxidizing gas 110 include but are not limited to air, $O_{2(g)}$ and a mixture of air and pure $O_{2(g)}$ to yield a supply of $O_{2(g)}$-enriched air.

Finally, the autoclave unit 92 further includes an agitator system 130 consisting of a conventional electric motor unit 132 and a mixing blade 134 operatively connected to and driven by the motor unit 132. The mixing blade 134 is positioned within the interior region 94 of the autoclave 92 and is designed to effectively agitate (e.g. mix) the contents of the autoclave 92 as discussed further below.

To implement this portion of the claimed dual-stage process using the equipment and components discussed above, the solid intermediate $MoO_3$ product 90 is delivered into the interior region 94 of the autoclave 92 followed by the addition of water thereto from the secondary supply of water 100 using the conduit 104 and in-line pump 106. Combination of the solid intermediate $MoO_3$ product 90 with the secondary supply of water 100 inside the autoclave 92 produces a second slurry 136 within the interior region 94 of the autoclave 92. In a preferred embodiment designed to produce high-efficiency purification, the second slurry 136 will have a slurry density which is preferably about 10–55% by weight solids (optimally about 30–35% by weight solids). The term "slurry density" as used herein shall again involve the total amount (in % by weight) of solid materials within the slurry under consideration as discussed above. These slurry density values are preferred because they produce ideal handling characteristics and reaction kinetics. To produce a second slurry 136 having the above-described characteristics, approximately 0.65–0.75 liters of the secondary supply of water 100 will typically be added per kg of the solid intermediate $MoO_3$ product 90 although this amount may vary in accordance with the chemical and physical character of the $MoO_3$ product 90. The precise amount of water 100 to be used at this stage will be determined in accordance with preliminary pilot studies on the specific compositions being processed.

After or during formation of the second slurry 136 as discussed above, the second slurry 136 is heated using the heating unit 96 associated with the autoclave 92 to a temperature of about 150°–250° C. (with optimum results being obtained within a temperature range of about 190°–210° C.). As the second slurry 136 is heated, it is also agitated (e.g. mixed) using the agitator system 130 in which the mixing blade 134 is rotated by the motor unit 132. During this process, the oxygen-containing oxidizing gas 110 is introduced into the interior region 94 of the autoclave 92 at a flow rate sufficient to maintain and achieve the desired gas pressure levels listed below. Specifically, the compressed oxidizing gas 110 is introduced into the autoclave 92 using the conduit 114 and pump 116 (if needed) in the embodiment of FIG. 1. To achieve a maximum level of purification efficiency, the pressure of the oxygen-containing oxidizing gas 110 within the interior region 94 of the autoclave 92 is maintained at a level of about 150–250 psi. This is accomplished through the use of a supply of gas 110 that is suitably compressed within the gas storage chamber 112.

Heating and mixing of the second slurry 136 within the interior region 94 of the autoclave 92 (as well as introduction of the oxidizing gas 110 into the autoclave 92) preferably takes place over a time period of about 30–90 minutes (optimally about 60 minutes). During this high temperature/elevated pressure slurrying stage, an important part of the desired purification process takes place. Specifically, remaining amounts of metallic contaminants (e.g. metals and metal compounds) that were not removed during the first stage of the claimed process become soluble during the second step. This situation occurs because of the relatively high temperature and pressure conditions within the autoclave 92. As a result, these materials dissolve within the secondary supply of water 100 which is used to form the second slurry 136. Likewise, in accordance with the high temperature conditions inside the autoclave 92 and the introduction of an oxygen-containing oxidizing gas 110 at high pressure levels, two additional benefits occur, namely, (1) remaining molybdenum "sub-oxides" are further oxidized and converted into $MoO_3$; and (2) any residual (unreacted) $MoS_2$ is oxidized and converted into $MoO_3$. In accordance with this step, nearly all of the remaining contaminants and other non-$MoO_3$ compositions discussed above are either solubilized within the secondary supply of water 100 or converted (in the case of molybdenum "sub-oxides" and/or residual $MoS_2$) into $MoO_3$. As a result, approximately 90–100% of the total non-$MoO_3$ compositions (including sulfur-containing materials) originally within the impure $MoO_3$ reaction product 42 at the beginning of the process will be eliminated at this stage.

The liquid portion of the second slurry 136 derived from the secondary supply of water 100 is then separated (e.g. removed) from the solid portion of the slurry 136. With reference to FIG. 1, this process is accomplished by passage of the second slurry 136 through a secondary filtration system 140 which is schematically illustrated in FIG. 1 and substantially the same (from a structural and functional standpoint) as the primary filtration system 84 discussed above. If needed or desired in accordance with preliminary pilot studies, the second slurry 136 may first be allowed to settle for a time period of about 10–30 minutes (optimally about 15 minutes) prior to filtration. Many different conventional systems may be used in connection with the secondary filtration system 140, with the present invention not being limited to any particular apparatus for this purpose. For example, the secondary filtration system 140 may again consist of a standard pressure leaf-type filter system or a conventional drum filter, horizontal belt filter, and the like. However, any type of filtration system may be used which is capable of separating the liquid components from the solid compositions within the second slurry 136.

As a result of this step, the filtrate 142 (which contains the solubilized metallic contaminants therein) is effectively separated from the remaining solid composition which shall be characterized as the final purified solid $MoO_3$ product 144. The filtrate 142 may be discarded, stored for further processing, or treated in a conventional manner (not shown) to recover the metals and metal compounds dissolved therein. The purified solid $MoO_3$ product 144 can then be washed one or more times (not shown) with additional supplies of deionized water if needed or desired as determined by preliminary routine testing. Thereafter, the purified MoO$_3$ product 144 can be stored or used in a number of conventional processes as a starting material in order to produce many different molybdenum materials ranging from complex catalysts to purified molybdenum metal. In this regard, the claimed process shall be not be restricted to any ultimate use for the purified MoO$_3$ product 144.

The present invention represents a substantial advance in molybdenum processing and provides many benefits over previously-known methods. In particular, molybdenum oxide purification is achieved in a highly effective manner without the use of extensive equipment, complex operating conditions, and harsh chemical reagents (e.g. mineral acids). Contaminant removal in accordance with the claimed invention significantly increases the overall operating efficiency of the entire production system and likewise provides the following specific benefits: (1) the ability to achieve MoO$_3$ purification in a highly simplified manner compared with prior processes; (2) elimination of the need to use acidic materials (e.g. mineral acids) and other harsh chemical reagents in the purification process; (3) a reduction in the number of process steps needed to achieve high yields of the desired final product; (4) the ability to simultaneously remove metallic contaminants from the MoO$_3$ product and likewise convert molybdenum "sub-oxides" and residual (unreacted) MoS$_2$ to MoO$_3$ in a process which involves water as the single primary liquid reagent; and (5) a high level of operational efficiency which enables large amounts of purified MoO$_3$ to be generated in a minimal amount of time using reduced levels of labor and materials. Accordingly, the unique dual-stage process of the present invention substantially departs from prior purification methods and represents a significant advance in the field of molybdenum refining as previously noted.

Having herein set forth preferred and optimum embodiments of the present invention, it is anticipated that suitable modifications can be made thereto by individuals skilled in the art which nonetheless remain within the scope of the invention. For example, the specific equipment being employed and the manner in which the various operating conditions are achieved may be varied within the scope of the invention. Accordingly, the present invention shall not be restricted to any particular operating components, and shall only be construed in connection with the following claims:

The invention that is claimed is:

1. A method for the production of a purified MoO$_3$ composition comprising:

providing a supply of MoS$_2$;

oxidizing said MoS$_2$ to produce an impure MoO$_3$ reaction product, said impure MoO$_3$ reaction product comprising a supply of insoluble contaminants and molybdenum sub-oxides combined therewith;

combining said impure MoO$_3$ reaction product with a primary supply of water to generate a first slurry in which at least a portion of said contaminants dissolves within said primary supply of water used to produce said first slurry;

removing said primary supply of water from said first slurry to yield a solid intermediate MoO$_3$ product, said portion of said contaminants dissolved within said primary supply of water being separated from said solid intermediate MoO$_3$ product during said removing of said primary supply of water from said first slurry;

combining said solid intermediate MoO$_3$ product with a secondary supply of water to generate a second slurry;

heating said second slurry in an atmosphere comprising oxygen therein at a temperature sufficient to dissolve any remaining amounts of said contaminants within said secondary supply of water which were not previously dissolved within said primary supply of water, said heating of said second slurry in said atmosphere also converting said molybdenum sub-oxides into MoO$_3$; and removing said secondary supply of water from said second slurry to yield a purified solid MoO$_3$ product, said remaining amounts of said contaminants dissolved within said secondary supply of water being separated from said purified solid MoO$_3$ product during said removing of said secondary supply of water from said second slurry.

2. The method of claim 1 wherein said temperature sufficient to dissolve said remaining amounts of said contaminants in said secondary supply of water is about 150°–250° C.

3. The method of claim 1 wherein said atmosphere comprising oxygen therein comprises a gas selected from the group consisting of O$_{2(g)}$, air, and mixtures thereof.

4. The method of claim 1 wherein said primary supply of water lacks any acid materials therein.

5. The method of claim 1 wherein said secondary supply of water lacks any acid materials therein.

6. The method of claim 1 wherein said first slurry has a slurry density of about 10–55% by weight solids.

7. The method of claim 1 wherein said second slurry has a slurry density of about 10–55% by weight solids.

8. The method of claim 1 further comprising the step of maintaining said atmosphere at a pressure level of about 150–250 psi during said heating of said second slurry in said atmosphere.

9. The method of claim 1 further comprising the step of heating first slurry to about 25°–97° C. prior to said removing of said primary supply of water from said first slurry.

10. The method of claim 9 wherein said heating of said first slurry takes place over a time period of about 45–90 minutes.

11. The method of claim 1 wherein said heating of said second slurry takes place over a time period of about 30–90 minutes.

12. A method for the purification of a purified MoO$_3$ composition comprising:

providing a supply of MoS$_2$;

oxidizing said MoS$_2$ to produce an impure MoO$_3$ reaction product, said impure MoO$_3$ reaction product comprising a supply of insoluble contaminants and molybdenum sub-oxides combined therewith;

combining said impure MoO$_3$ reaction product with a primary supply of water to generate a first slurry in which at least a portion of said contaminants dissolves within said primary supply of water used to produce said first slurry;

removing said primary supply of water from said first slurry to yield a solid intermediate MoO$_3$ product, said portion of said contaminants dissolved within said primary supply of water being separated from said solid intermediate MoO$_3$ product during said removing of said primary supply of water from said first slurry;

combining said solid intermediate MoO$_3$ product with a secondary supply of water to generate a second slurry having a slurry density of about 10–55% by weight solids;

heating said second slurry to about 150°–250° C. in an atmosphere comprising oxygen therein, said atmosphere being maintained at a pressure level of about 150–250 psi in order to dissolve any remaining amounts of said contaminants within said secondary supply of water which were not previously dissolved within said primary supply of water, said heating of said second slurry in said atmosphere also converting said molybdenum sub-oxides into $MoO_3$; and removing said secondary supply of water from said second slurry to yield a purified solid $MoO_3$ product, said remaining amounts of said contaminants dissolved within said secondary supply of water being separated from said purified solid $MoO_3$ product during said removing of said secondary supply of water from said second slurry.

13. The method of claim 12 wherein said atmosphere comprising oxygen therein comprises a gas selected from the group consisting of $O_{2(g)}$, air, and mixtures thereof.

14. The method of claim 12 wherein said primary supply of water lacks any acid materials therein.

15. The method of claim 12 wherein said secondary supply of water lacks any acid materials therein.

16. The method of claim 12 wherein said first slurry has a slurry density of about 10–55% by weight solids.

17. The method of claim 12 further comprising the step of heating said first slurry to about 25°–97° C. prior to said removing of said primary supply of water from said first slurry.

18. The method of claim 12 wherein said heating of said second slurry takes place over a time period of about 30–90 minutes.

19. A method for the production of a purified $MoO_3$ composition comprising:

providing a supply of $MoS_2$;

oxidizing said $MoS_2$ to produce an impure $MoO_3$ reaction product, said impure $MoO_3$ reaction product comprising a supply of insoluble contaminants and molybdenum sub-oxides combined therewith;

combining said impure $MoO_3$ reaction product with a primary supply of water lacking any acid materials therein to generate a first slurry in which at least a portion of said contaminants dissolves within said primary supply of water used to produce said first slurry, said first slurry having a slurry density of about 10–55% by weight solids;

heating said first slurry to about 25°–97° C. for a time period of about 45–90 minutes;

removing said primary supply of water from said first slurry to yield a solid intermediate $MoO_3$ product, said portion of said contaminants dissolved within said primary supply of water being separated from said solid intermediate $MO_3$ product during said removing of said primary supply of water from said first slurry;

combining said solid intermediate $MoO_3$ product with a secondary supply of water lacking any acid materials therein to generate a second slurry having a slurry density of about 10–55% by weight solids;

heating said second slurry to about 150°–250° C. for a time period of about 30–90 minutes in an atmosphere comprising a selected from the group consisting of $O_{2(g)}$, air, and mixtures thereof which is maintained at a pressure level of about 150–250 psi in order to dissolve any remaining amounts of said contaminants within said secondary supply of water which were not previously dissolved within said primary supply of water, said heating of said second slurry in said atmosphere also converting said molybdenum sub-oxides into $MoO_3$; and removing said secondary supply of water from said second slurry to yield a purified solid $MoO_3$ product, said remaining amounts of said contaminants dissolved within said secondary supply of water being separated from said purified solid $MoO_3$ product during said removing of said secondary supply of water from said second slurry.

* * * * *

UNITED STATES PATENT AND TRADEMARK OFFICE
CERTIFICATE OF CORRECTION

PATENT NO. : 5,820,844
DATED : October 13, 1998
INVENTOR(S) : Khan et al.

It is certified that error appears in the above-identified patent and that said Letters Patent is hereby corrected as shown below:

On the title page, item [54]:

Delete "MOO$_3$," and insert therefor --MoO$_3$--.

Column 1, (line 21), delete "(MOS$_2$) and insert therefor --(MoS$_2$)--.

Column 9, (line 7), delete "0.03"0.6%" and insert therefor --0.03-0.6%--.

Column 10, (line 39), delete "with" and insert therefor --will--.

Column 10, (line 56), delete "O$_{2(g))}$" and insert therefor --O$_{2(g)}$)--.

Column 17, (line 6), after "shall" delete "be".

IN THE CLAIMS

Column 20, (line 13), delete "MO$_3$" and insert therefor --MoO$_3$--.

Column 20, (line 22), after "a" insert --gas--.

Signed and Sealed this

Twentieth Day of July, 1999

Attest:

*Attesting Officer*

Q. TODD DICKINSON

*Acting Commissioner of Patents and Trademarks*